United States Patent [19]

Schmid

[11] 4,337,011
[45] Jun. 29, 1982

[54] CRANKSHAFT MILLING MACHINE

[75] Inventor: Karlheinz Schmid, Neckartenzlingen, Fed. Rep. of Germany

[73] Assignee: Gebrueder Heller, Maschinenfabrik GmbH, Nuertingen, Fed. Rep. of Germany

[21] Appl. No.: 140,686

[22] Filed: Apr. 16, 1980

[30] Foreign Application Priority Data

Apr. 18, 1979 [DE] Fed. Rep. of Germany ....... 2915662

[51] Int. Cl.³ .............................................. B23C 3/06
[52] U.S. Cl. ................................ 409/199; 51/105 SP; 409/201; 409/241
[58] Field of Search .................... 51/105 SP; 409/199, 409/200, 201, 241, 206, 221

[56] References Cited

U.S. PATENT DOCUMENTS

| | | | |
|---|---|---|---|
| 2,721,424 | 10/1955 | Teisen | 51/105 SP |
| 3,118,258 | 1/1964 | Price et al. | 51/105 SP |
| 3,352,065 | 11/1967 | Enkelmann | 51/105 SP |
| 3,789,709 | 2/1974 | Kendall et al. | 51/105 SP |
| 4,215,962 | 8/1980 | Kreucher | 409/241 |

Primary Examiner—William R. Briggs
Attorney, Agent, or Firm—W. G. Fasse; D. F. Gould

[57] ABSTRACT

The present crankshaft milling machine comprises at least one milling unit which may be controlled in its feed advance drive by a copying mechanism operating in synchronism with the rotation of the work piece. The copying mechanism is movable back and forth along a guide extending in parallel to the longitudinal axis of the work piece along a guide. The guide for the copying mechanism defines a plane which extends substantially vertically on one side of the work piece or crankshaft and in parallel to the crankshaft axis. Each milling unit is tiltably supported on a tilting axis located below the work piece axis and extending in parallel to the work piece axis. The feed advance drive is arranged on the side of the tilting axis facing away from the work piece. The feed advance drive reaches over the work piece, whereby a closed force flow around the work piece is established and the milling forces need not be introduced into the machine bed.

10 Claims, 4 Drawing Figures

CRANKSHAFT MILLING MACHINE

BACKGROUND OF THE INVENTION

The present invention relates to a crankshaft milling machine having at least one milling unit which is controllable in its feed advance by a copying mechanism operating in synchronism with the rotation of the work piece.

Prior art crankshaft milling machines of this type have a guide for the milling unit and the guide defines a plane located below the work piece and substantially horizontally. Further, the milling unit is arranged on a second guide also extending horizontally and perpendicularly to the longitudinal axis of the work piece. The milling unit is controlled in its feed advance by a so-called copying mechanism. Reference is made in this connection to a publication entitled "Werkstatt und Betrieb" Volume 110, H.3, 1977, pages 137 to 145.

The disadvantages of horizontally extending guides in crankshaft milling machines are well known. A guide in this position primarily hinders the removal flow of milled-off chips. Additionally, the horizontal guide makes the access to the machine difficult for exchanging the work piece as well as the milling tool.

Thus, it is known to use guides in turning lathes which define a plane extending on one side of the work piece and in parallel to the work piece axis as well as substantially in a vertical plane so that the chips milled-off during the operation may bypass the guide to fall downwardly. Additionally, the space between the work piece clamping chuck or vise is freely accessible from one side in the sense that the operator may enter into the space between the work piece clamping means without even having the possibility of stepping onto components of the machine tool.

However, in connection with crankshaft milling machines, such machines which may be referred to as vertical bed machines have not yet been considered. The milling units of crankshaft milling machines have a substantial weight. Thus, the feed advance drive would have to either be capable to move the substantial weight of the milling unit up and down or a respective weight balancing would have to be provided. Such weight balancing would relieve the feed advance drive of the weight of the milling unit. However, such weight balancing means would entail a substantial additional expense.

German Utility Model No. 7,106,698 describes a different type of crankshaft milling machine in which the milling unit is tiltable about a swivel axis extending in parallel to the axis of the work piece and located below the work piece axis. Additionally in this prior art milling machine the feed advance drive is also located below the swivel axis so that the entire machine has an unnecessary structural height. Additionally, the feed advance drive hindered the chip removal flow as well as the accessibility of the inside of the machine to an extent more than is the case in the known horizontal bed milling machine. Thus, the structure disclosed in German Utility Model No. 7,106,698 has not found any acceptance in practice.

German Pat. No. 957,711 describes a copying milling machine for turbine blades or vanes in which the milling unit is tiltable about a swivel axis extending in parallel to the work piece axis. Additionally, the feed advance drive for the milling unit is arranged on the side of the work piece facing away from the swivel axis. In this type of milling machine the swivel axis was substantially located in the same horizontal plane as the work piece axis so that the feed advance drive was required to balance the weight of the milling unit as described above. Such an arrangement is possibly acceptable in connecting with copying milling machines for turbine blades because the milling units in such machines have a relatively small weight, without inviting problems. However, in connection with crankshaft milling machines this type of structure is not acceptable because the milling units in crankshaft milling machines have a substantial weight relative to the weight of the entire machine structure.

In prior art machines it was not possible to achieve a closed force flow around the work piece so that the milling forces had to be taken up or conducted through the machine bed or frame. Thus, the use of these measures in connection with milling machines having a guide bed extending about vertically is not possible without difficulties. Such difficulties are seen in that the vertical bed would have to be of a correspondingly solid construction. Such solid construction would even further increase in three directions the good sound damping characteristics of these machines. However, such improvement would require an additional expense which could not be justified from an economical point of view.

OBJECTS OF THE INVENTION

In view of the above it is the aim of the invention to achieve the following objects singly or in combination:

to construct a crankshaft milling machine of the type mentioned above in such a way that the advantages of a vertically arranged guide bed are realized while simultaneously the above outlined disadvantages are avoided;

to arrange a swivel axis in such a manner that it fully takes up the weight of the milling unit or units;

to protect the swivel axis against damage by milled-off chips, thereby avoiding additional protection features;

to increase the precision of such milling machines; and to arrange the milling unit and the feed advance drive in such a manner that a closed force flow around the work piece is accomplished, thereby relieving the machine frame of the cutting forces.

SUMMARY OF THE INVENTION

According to the invention there is provided a crankshaft milling machine in which the guide bed for the milling unit extends substantially vertically and in parallel to the work piece axis on one side of the work piece axis. A swivel axis is operatively arranged in the machine frame below the work piece axis and in parallel thereto. The milling unit is tiltably connected to the swivel axis and the feed drive means for the milling unit, which feed drive means are controlled by the copying mechanism, are located on that side of the work piece facing away from the swivel axis. The feed drive means reach over the work piece so that a closed force flow is achieved around the work piece and the machine bed is substantially relieved of the cutting or milling forces. Thus, the machine bed may be of relatively light construction and of narrow width.

By arranging the milling unit or rather, each milling unit, for tilting about a swivel axis extending in parallel to and below the work piece axis, it is possible that the weight of the milling unit is completely taken up by this swivel axis which may be constructed correspondingly rigidly without any difficulties. This type of structure further has the advantage that the swivel axis is protected by the milling unit itself against the chips that are being produced during the machining or milling operation so that practically no additional protective features are required except for the covering of the end faces.

By arranging the feed advance drive on the side of the work piece facing away from the swivel axis the invention achieves a lever arm for the effectiveness of the feed advance drive which is longer in any event than the lever arm on which the milling tool is effective. This type of structure results on the one hand in a reduction of the forces effective on the feed advance drive so that the load on a master journal, that may be used in the copying mechanism, is reduced or the torque moment delivered by a feed advance drive motor may be reduced. On the other hand, the length of the distances to be traversed by the movable components is increased so that, for example, inaccuracies of the master pin used in the copying mechanism are effective only to a substantially reduced degree. Similarly, in connection with a numerical control of the milling operation a corresponding increase of the r.p.m. of the drive motor is possible, whereby again, the precision is improved. Another advantage of the invention is seen in that by the disclosed structure the feed advance drive is also located in a zone where it is not influenced by any flying chips that may occur during the operation.

BRIEF FIGURE DESCRIPTION

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
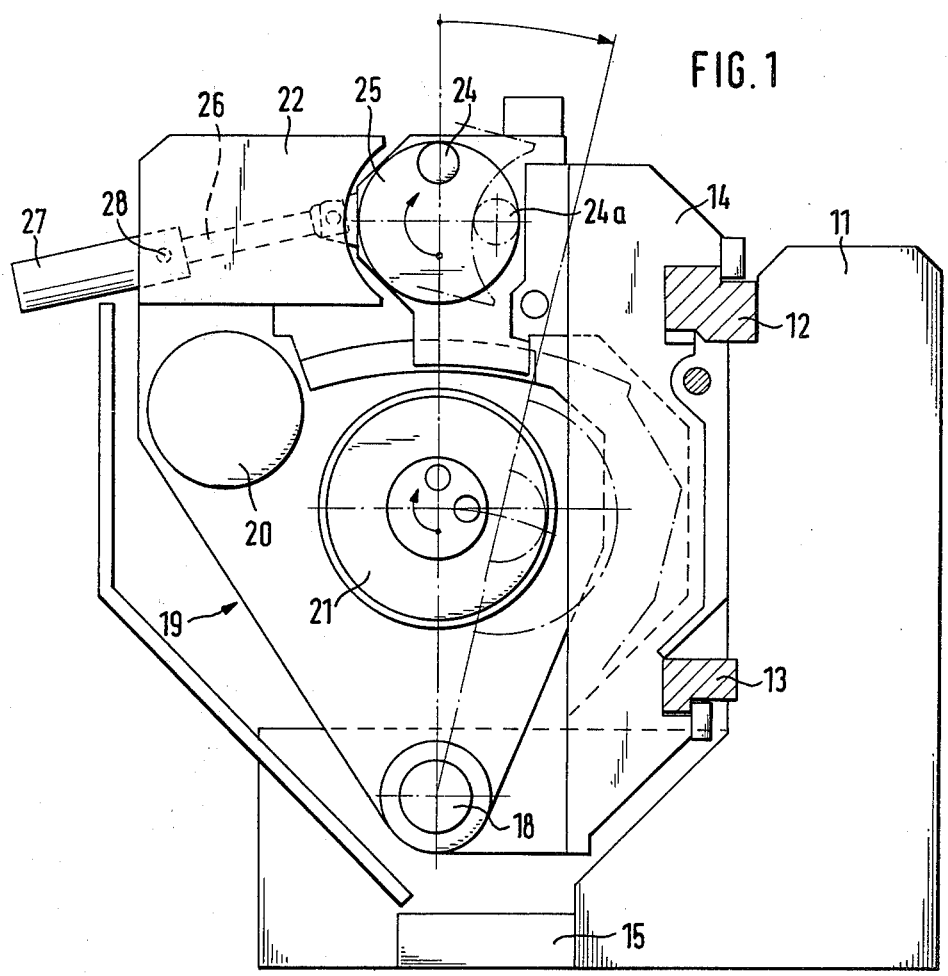
FIG. 1 is a sectional view through a crankshaft milling machine according to the invention.
Figure 2:
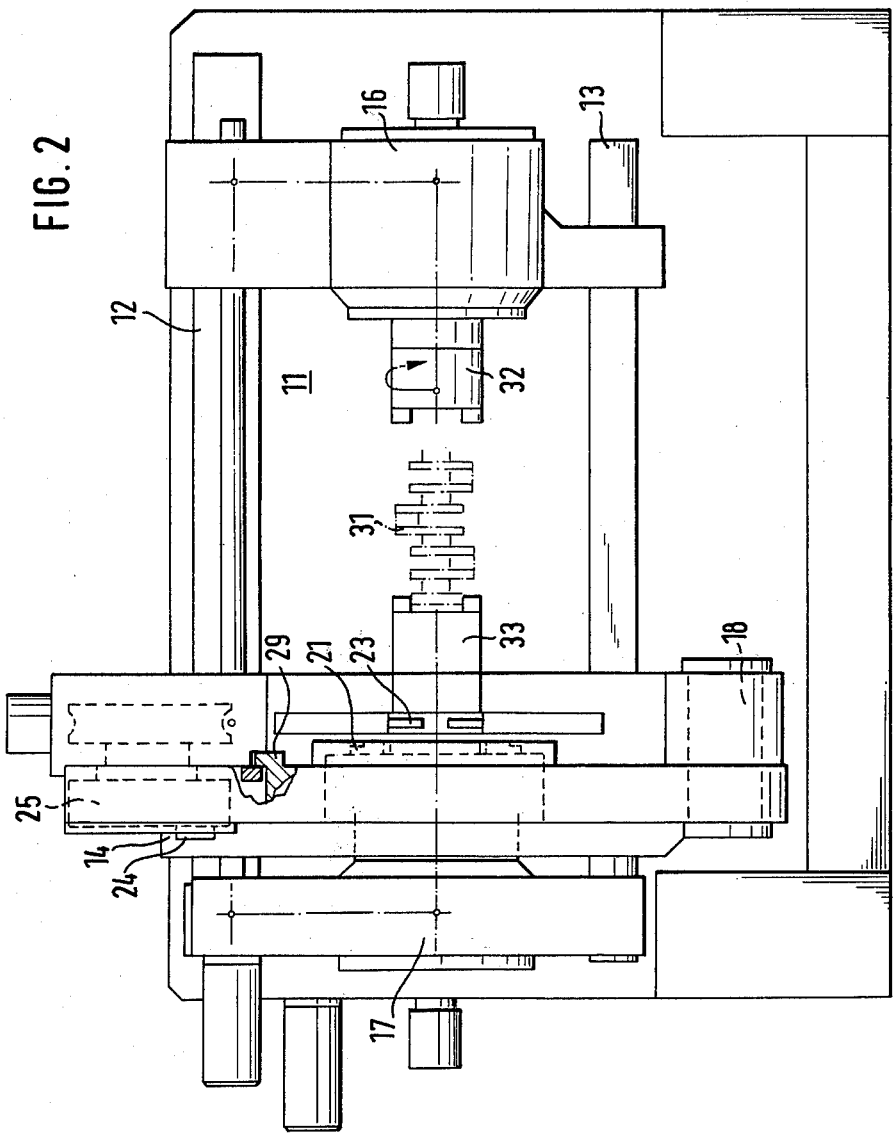
FIG. 2 shows an elevational view of the crankshaft milling machine according to FIG. 1 partially in section.

The crankshaft milling machine shown in FIGS. 1 and 2 comprises a machine bed 11, for example, made of concrete, carrying two guide rails 12 and 13, one arranged vertically above the other. A slide 14 is horizontally displaceable along these guide rails 12 and 13. A chip conveyor 15 is located below the slide 14. Two chuck heads 16 and 17 are also supported by the machine bed 11. These chucking heads 16 and 17 clamp the crankshaft 31 to be machined in a known manner. The crankshaft 31 is driven in synchronism also in a known manner.

A swivel axis 18 is arranged in the lower portion of the slide 14 for carrying a milling slide unit 19 which is tiltably supported on the swivel axis 18. The milling slide unit 19 comprises a milling drive motor 20, an inside milling tool 21 merely shown schematically, and a scanning template 22 rigidly coordinated with the milling tool 21 and corresponding thereto. Further, the slide 14 carries a so-called back rest 23 for supporting the crankshaft at its main bearing journal which is located adjacent to the stroke journal that is being machined by the inner milling tool 21. Such a back rest 23 is known in the art.

The slide 14 carries at its upper end a master journal pin 24 corresponding to the stroke journal pin to be machined. The master journal pin 24 is located on a disc 25 in a conventional manner. The disc 25 which is schematically shown in FIG. 2 is driven in synchronism with the two chucking jaws 32 and 33 of the clamping heads 16 and 17 as is also known in connection with crankshaft milling machines. A piston rod 26 is pivotally supported by the carrier of the master journal disc 25. The piston rod 26 is connected to a hydraulic piston in the cylinder 27 in which the piston is guided for displacement. The cylinder 27 in turn is tiltably supported as shown at 28 in the upper part of the milling unit 19.

A lateral guide 29 for the milling slide unit 19 is provided in a crankshaft milling machine according to the invention as illustrated in FIGS. 1 and 2, said lateral guide 29 being located below the master journal disc 25. The guide 29 takes up forces which extend in a direction parallel to the axis of the crankshaft to be milled so that the milling slide unit 19 may be constructed to have a narrow width. Instead of making the milling slide unit 19 narrow, it would be possible to make the swivel axis 18 correspondingly longer and to place two circular guides on the swivel axis 18, one of these circular guides being arranged on each side of the milling tool 21 proper. However, this modification requires somewhat more space. In a preferred embodiment the lateral guide 29 is equipped with a damping means which is effective in the feed advance direction, that is, in the tilting direction. For example, a friction surface could act as a damping means to make sure that the entire milling unit does not directly follow smaller jerky loads or load removals that may possibly occur. Such damping means are desirable, particularly when comparing the present circular guides which have a very low friction, with linear guides which take up the entire weight of the milling units. Such very low friction circular guides are formed by the swivel axis 18. Such damping means make it possible to avoid increasing the inertia mass of the milling unit merely for the purpose of increasing its inertia, that is the resistance against such small jerky variations.

The milling machine illustrated in FIGS. 1 and 2 operates as follows. As seen in FIG. 2 the slide 14 is moved into its extreme left position for inserting a crankshaft 31 to be milled. The space between the two chucking jaws 32 and 33 is free when the slide 14 is in its leftmost position. At the same time the milling slide unit 19 is in its centered position so that the milling tool 21 may be moved into a position above the cantilevered portion of the chucking head 17 and the back rest 23 must be fully opened so that it may also be moved into a position above the cantilevered portion of the chucking head 17. In this position of the slide 14 the space between the two chucking jaws 32 and 33 is freely accessible.

The crankshaft 31 is then chucked in the chucking heads 16 and 17 in a conventional manner and the master journal 24 is also brought conventionally into the position which corresponds to the position of the first crankshaft journal which is to be machined. Thereafter, the milling slide 14 is moved to the right until the inner circumference of the milling tool 21 which is provided with cutters is located in the proper position opposite the stroke journal to be machined. At this time the back rest 23 is located opposite the main bearing adjacent to the stroke journal to be machined. The main bearing has already been machined. Then, the main bearing journal is supported by the back rest 23 in a conventional manner whereupon the feed advance of the milling slide unit 19 begins. For this purpose the hydraulic cylinder 27 is supplied with a pressure medium in such a manner that it pulls in the piston which is connected to the piston rod 26, whereby the milling unit 19 is tilted in the clockwise direction as seen in FIG. 1. Normally, the stroke journal to be machined is located at this time at a point of its rotation furthest away from the milling cutter. The master journal pin 24 is also located at a point 24a along its orbit, as shown in FIG. 1, furthest away from the scanning template 22. Thus, the milling tool 21 needs to mill initially only the sides or faces adjacent to the stroke bearing then to be machined. For this initial machining generally the highest milling force is necessary so that correspondingly the pressure of the pressure medium supplied to the cylinder 27 must have its highest value. This pressure is balanced, of course, by the cutting forces. At the end of this so-called plunging movement the scanning template 22 engages the master journal pin 24 in its position 24a. At this moment the pressure of the pressure medium supplied to the cylinder 27 is reduced according to one embodiment of the invention. It is not harmful at all if the scanning template 22 is applied briefly with the maximum pressure because at this time the master journal pin 24 is stationary though at this time no cutting forces occur. In any event, this maximum pressure is substantially smaller than the milling force having regard to the dimensional ratios illustrated in FIG. 1, namely, the distance between the swivel axis 18 to the center of the master journal pin disc 25 is twice as large as the spacing between the swivel axis 18 and the axis of the clamping heads 16, 17. With this dimensional ratio the maximum pressure is only half as large as the milling force. Besides, the master journal pin 24 has, under these conditions, a diameter twice as large as the diameter of the stroke journal pin to be machined so that the master journal pin is capable of withstanding this pure pressure loading without any problems.

During the subsequent circular feed advance the maximum cutting force is substantially smaller than during the just described so-called plunging feed advance. During the circular feed advance the crankshaft rotates about the axis of the clamping heads 16 and 17 in synchronism with the rotation of the master journal pin disc 25 which rotates about its center. In view of these facts the invention provides in a special embodiment that the feed advance force, in other words, the pressure of the pressure medium supplied to the hydraulic cylinder 27, is correspondingly reduced during the circular feed advance so that even when the feed advance force is not balanced by any cutting force, the pressure exerted by the scanning template 22 on the master journal pin 24 is correspondingly reduced. This feature of the invention has the advantage that the wear and tear of the scanning template 22 and of the master journal pin 24 may be disregarded for practical purposes. Thus, it is now possible to permit the full feed advance force to be directly effective on the scanning template 22 in the manner described, thereby obviating the need for a sensor control. Heretofore, such sensor controls have been necessary for relieving of the scanning templates and the master journal pin in similar copying means or devices. Such sensor control necessarily involves the so-called copying errors which in turn require additional measures for their removal.

In order to optimize the milling or machining operation, the circular feed advance of the master journal pin 24 is controlled in a known manner in such a way that the feed advance per tooth of the milling tool is constant at all times.

Upon completion of the circular feed advance, the master journal pin 24 is again in its position 24a and then pressure medium is supplied to the hydraulic cylinder 27 in such a sense that the milling slide unit 19 is tilted in the counter-clockwise direction as viewed in FIG. 1. In other words, the milling slide unit 19 is withdrawn until it reaches its neutral position. When the milling slide unit 19 is in such neutral position the back rest 23 is opened and the slide 14 is advanced further to the right until the next stroke bearing journal is reached where the above described same step takes place and so on until all stroke bearing journals have been machined. Thereafter, the milling slide unit 19 is again moved into the right hand position as viewed in FIG. 2, the machined crankshaft is removed from the milling machine and a new blank crankshaft to be machined is inserted, whereupon the described steps are repeated.

It has been mentioned above that the milling force assumes during the circular feed advance a maximum value, stated differently, the milling force varies. Since the scanning template 22 contacts the master journal pin 24 respectively with that portion of the feed advance force which is not balanced by the milling forces, it would be possible to achieve the least wear and tear of the scanning template 22 and the master journal pin 24 if the feed advance force is controlled to precisely correspond to the respectively required milling force. This least wear and tear could be accomplished or rather the respective control of the feed advance force could be accomplished by measuring the power supplied to the motor or by measuring the contact pressure. However, these possibilities require a rather substantial additional technical effort. Such additional technical effort is generally not justified from an economical point of view if only, as described, during the plunging movement the sides or faces may be machined. Only if a substantial proportion of the sides or faces require machining during the circular feed advance, which is necessary in certain instances, such technical effort is at least justifiable from a practical point of view.

As mentioned above, the milling unit in a crankshaft milling machine according to the invention may be constructed with a very narrow width. Stated differently the milling unit has a relatively small dimension in the direction parallel to the longitudinal work piece axis. This feature provides the advantage that two milling units may be arranged rather close together, whereby the spacing between the two milling units will correspond to the spacing between two adjacent stroke bearing journal pins of a crankshaft. By arranging two milling units next to each other, the production capacity of a machine according to the invention may be substantially increased. In such an embodiment the milling units would be constructed to have a mirror symmetrical configuration relative to a central common plane and the milling tool proper would be arranged on the side facing the respective other milling unit.

Figure 3:
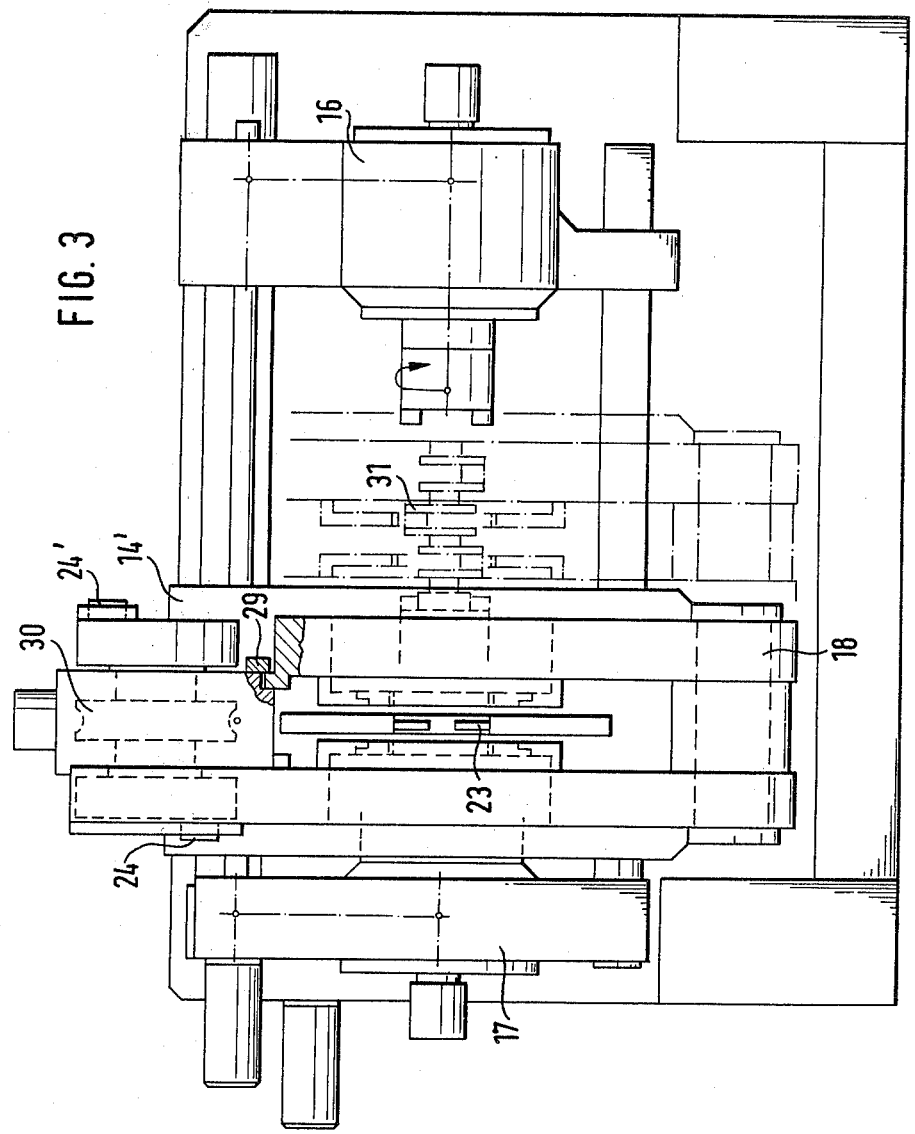
FIG. 3 is a view corresponding to that shown in FIG. 2, but illustrating a modification of the crankshaft milling machine according to FIGS. 1 and 2.

FIG. 3 illustrates an embodiment of the basic teaching described in the preceding paragraph, with additional features. As in FIG. 2, the back rest 23 which is required for supporting the main journal bearing pin adjacent to a stroke bearing journal pin that is to be machined, does not require any additional, independent support structure. Rather, the back rest may be arranged directly on the slide 14. The construction of the guide for the milling unit according to the invention is located at the lower portion of the slide 14 and the back rest 23 may be supported on the central portion of the slide 14. Therefore, the guide structure for the milling unit and the back rest do not interfere with each other as was the case prior to the invention. Thus, two milling units may be arranged on the same slide 14', please see FIG. 3.

In any other respect the milling unit and the master bearing journal pin are constructed and arranged in the same manner as in the embodiment of FIG. 2 so that a further description would be repetitious and hence unnecessary. However, by arranging both master journal pins 24 and 24' on the common longitudinal slide 14' it is possible to provide but a single drive mechanism 30 which is constructed in the same manner as the drive mechanism for a single master pin, that is, it operates in synchronism with the two clamping heads 32 and 33.

According to the invention it is possible that both milling units perform the plunging motion simultaneously and that thereafter the circular feed advance is also performed in common for both units. This is possible because both milling units are controlled completely in synchronism while nevertheless being completely independent of each other in their movements. Thus, it is also possible without more than the milling units, due to the different positions of the stroke bearing journal pins or the respective master pins 24, 24' relative to each other, may perform tilting motions about the swivel axis 18 in directions opposing each other. A constant feed advance per tooth of the milling tool is, however, not possible in this embodiment. However, by using a control mechanism which is known as such, it is possible to control the circular feed advance speed in such a manner that the feed advance per tooth achieves advantageous mixed or mean values for both milling tools in spite of the fact that the feed advance is not constant per tooth.

In the embodiments described so far including FIG. 3, a copying device was used including a scanning template 22, a master pin 24, and a hydraulic cylinder 27. However, it is self understood, that the hydraulic cylinder 27 may be replaced by any other suitable drive mechanism, especially such as an electrical drive.

Figure 4:
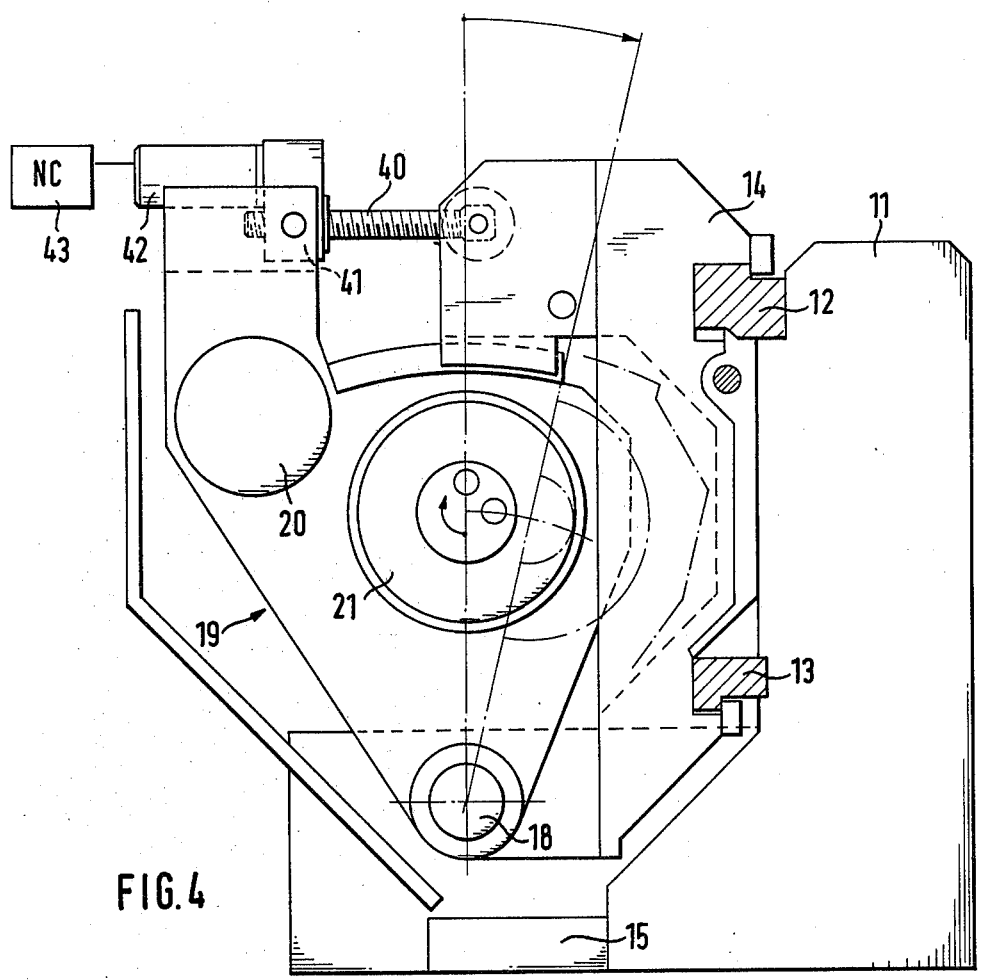
FIG. 4 is a view corresponding to that of FIG. 1, but showing a further modification of the crankshaft milling machine of FIGS. 1 and 2.

In the embodiment according to FIG. 4 the hydraulic cylinder 27, the scanning template 22, and the master journal pin 24 have been replaced by a so-called ball roller spindle 40 which operatively connects the upper end of the slide 14 with the upper end of the milling slide unit 19. More specifically, the threaded nut 41 is arranged on one of the two components and the ball roller spindle 40 is operatively supported in the other of the two components. The use of a ball roller spindle 40 is possible due to its arrangement outside the zones of milling chips and due to the small load accomplished as a result of the increase of the distance travelled relative to the milling tool. Either the nut 41 or the ball roller spindle 40 is operatively connected to a drive motor 42 provided in a manner known as such with a numerical control 43. Thus, the motor 42 is controlled by the numerical control 43 in response to the rotation of the crankshaft, that is, of the two clamping or chucking heads 32, 33, and in response to the position of the respective stroke journal bearing pin which is to be machined. Thus, the numerical control 43 provides the same tilting movement of the milling slide unit 19 as described above with reference to the hydraulically driven, strictly mechanical copying means. The embodiment of FIG. 3 may be correspondingly modified. Although the invention has been described with reference to specific example embodiments, it is to be understood, that it is intended to cover all modifications and equivalents within the scope of the appended claims.

What is claimed is:

1. A crankshaft milling machine, comprising machine frame means, at least one milling slide unit (14, 19) including slide means (14) and milling head means (19) on said slide means, said milling slide unit being operatively supported in said machine frame means for milling the stroke and bearing journals of a crankshaft, crankshaft support means defining a longitudinal axis and carried by said machine frame means for cooperation with said milling slide unit, feed drive means operatively connected to said milling slide unit, copying means mounted to be operable in synchronism with the rotation of the crankshaft support means, said copying means being operatively connected to said feed drive means for controlling the latter, guide means (12, 13) held in said frame means, said milling slide unit being movable along said guide means (12, 13) in parallel to said longitudinal axis, said guide means for said milling slide unit defining a plane extending on one side of the crankshaft support means and substantially vertically in parallel to said longitudinal axis, swivel axis means (18) operatively located in said milling slide unit below said longitudinal axis and in parallel to said longitudinal axis, said milling head means (19) being tiltably connected to said swivel axis means (18), said feed drive means being located on that side of the longitudinal axis facing away from the swivel axis means (18), said feed drive means extending between the milling slide unit and the milling head means and over said longitudinal axis, whereby a closed force flow is achieved and the machine frame is substantially relieved of the milling forces.

2. The milling machine of claim 1, comprising further guide means (29) for said milling slide unit (19) radially spaced from said swivel axis means (18).

3. the milling machine of claim 1, comprising a pair of circular guide means for said milling slide unit, each of said circular guide means including guide components operatively located on said swivel axis means, and both being axially spaced one from the other along said swivel axis means.

4. The milling machine of claim 1, further comprising damping means arranged for cooperation with said milling slide unit for damping the feed advance movement of said milling slide unit.

5. The milling machine of claim 1, wherein said copying means comprise master journal pin means, scanning template means operatively arranged to scan said master journal pin means, said feed drive means comprising piston cylinder means operatively urging said scanning template means directly against said master journal pin means.

6. The milling machine of claim 5, further comprising pressure control means operatively responsive to the rotation of the crankshaft work piece and operatively connected to control the pressure in said piston cylinder means in response to said rotation.

7. The milling machine of claim 1, wherein said feed drive means and said copying means in combination comprise a numerically controlled drive means, and ball roller spindle means operatively connected to said numerically controlled drive means.

8. The milling machine of claim 1, comprising a further milling slide unit constructed mirror symmetrically relative to said first mentioned milling slide unit whereby both milling slide units are adapted for milling stroke bearing journal pins.

9. The milling machine of claim 8, further comprising slide means, both of said milling slide units being operatively supported in common on said slide means.

10. The milling machine of claim 9, wherein each of said two milling slide units comprises its respective copying means with a respective master journal pin, said machine further comprising drive means provided in common for both master journal pins.

* * * * *